(12) United States Patent
Münzenberger et al.

(10) Patent No.: US 6,314,692 B1
(45) Date of Patent: Nov. 13, 2001

(54) LEAD-IN SYSTEM FOR CEILINGS AND WALLS INCLUDING TRAPEZOIDALLY CORRUGATED SHEET METAL FRAMEWORK

(75) Inventors: Herbert Münzenberger, Wiesbaden; Arndt Andresen, Landsberg/Lech, both of (DE); Jean-Louis Milhes, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/631,761

(22) Filed: Aug. 3, 2000

(30) Foreign Application Priority Data

Apr. 25, 2000 (DE) ................................................ 200 07 477

(51) Int. Cl.$^7$ ...................................................... E04C 2/52
(52) U.S. Cl. ........................... 52/220.1; 52/220.8; 98/46; 285/158
(58) Field of Search ............................... 52/220.1, 220.8, 52/380, 202, 203, 424; 285/202, 203, 424

(56) References Cited

U.S. PATENT DOCUMENTS

| | | | |
|---|---|---|---|
| 2,985,091 | * 5/1961 | Hatcher | 98/46 |
| 3,061,338 | * 10/1962 | Clark | 285/202 |
| 4,669,759 | * 6/1987 | Harbeke | 285/158 |
| 5,293,724 | * 3/1994 | Cornwall | 52/220.8 |

* cited by examiner

Primary Examiner—Carl D. Friedman
Assistant Examiner—Steve Varner
(74) Attorney, Agent, or Firm—Sidley Austin Brown & Wood, LLP

(57) ABSTRACT

A cast-in concrete (1), lead-in system (2) for ceilings and walls having a trapezoidally corrugated sheet metal formwork (7) and including a lead-in sleeve (3) for receiving one of a tubular conduit and a cable and having at least three outer, circumferentially spaced from each other, fixing points (4a, 4b, 4c) for securing the lead-in sleeve to the trapezoidally corrugated sheet metal formwork (7), and at least two stiff looking elements (5a, 5b) each having a connection element (12) for a formlocking connection with the fixing points (4a, 4b, 4c) of the lead-in sleeve and a mounting element (6) for securing the locking element (5a, 5b) to peak regions (8) of trapezoidal corrugations of the trapezoidally corrugated sheet metal framework.

10 Claims, 2 Drawing Sheets

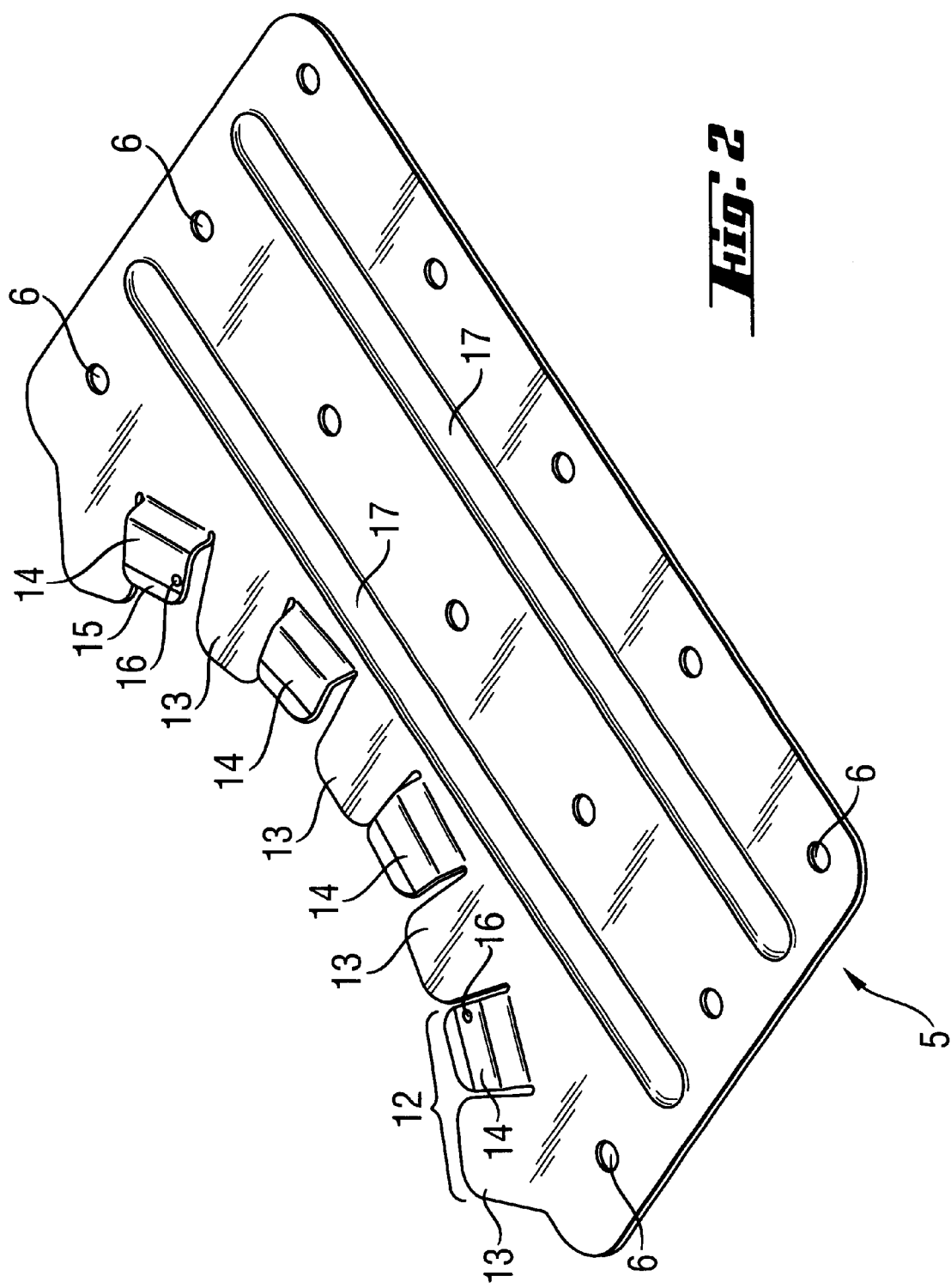

US 6,314,692 B1

LEAD-IN SYSTEM FOR CEILINGS AND WALLS INCLUDING TRAPEZOIDALLY CORRUGATED SHEET METAL FRAMEWORK

BACKGROUND OF THE INVENTION

1. Field of the Invention

The present invention relates to a cast-in concrete, lead-in system for ceilings and walls having a trapezoidally corrugated sheet metal framework and including a lead-in sleeve for receiving one of a tubular conduit and a cable and having at least three outer, circumferentially spaced from each other, fixing points for securing the lead-in sleeve to the trapezoidally corrugated sheet metal formwork.

2. Description of the Prior Art

In contemporary building constructions, formworks formed of trapezoidally corrugated sheet metal that consists of alternating valley and peak regions, found a wide application. Primarily, such formworks are used in substantially horizontal ceilings and are cast in concrete on the site. The trapezoidally corrugated sheet metal remains on the lower side of the ceiling. Often, for subsequent insertion of tubular leads-in through the ceiling, space retainers are mounted in the formwork to provide a concrete-free space for the leads-in.

Likewise, space retainers are provided in double walls. The space retainers for conduits or cable leads-in, before being cast-in concrete, should be reliably secured both axially and angularly with respect to the formwork plane.

U.S. Pat No. 4,261,598 discloses mounting on a formwork of a coupling sleeve instead of a cast-in concrete, space retainer, and a tubular member having a tubular end, which partially projects into the coupling sleeve, and extends through an opening formed in the formwork.

U.S. Pat. No. 4,669,759 discloses fire-retarding leads-in which include an appropriately deformed lead-in sleeve, an end-side outer ring for a temporary mounting, and a ring-shaped sealing which is partially formed of an intermescent material and is mounted inside the lead-in sleeve in the radially widen region of the sleeve. The lead-in is mounted on the formwork and is cast in concrete.

U.S. Pat. No. 5,293,724 discloses a short mounting sleeve with an end surface outer ring for mounting the sleeve on a trapezoidally corrugated sheet metal, and a tubular member extending through the sleeve, the formwork and the concrete ceiling. The end surface outer ring is mounted either in a valley region, on a peak region, or is mounted over two adjacent peak regions. The drawback of this solution consists in that this non-fire-retarding mounting sleeve is characterized by a limited mountability with respect to different, conventionally used formworks because of the difficulty to proper dimension the outer ring. A reliable mounting of such leads-in, in particular of leads-in having small diameters, with respect to precise positioning of the lead-in, is not always possible because of different widths of peak and valley regions of the trapezoidal corrugations of the sheet metal. In the transitional region between peak and valley regions or in a valley region adjacent to the transitional region, a securing of a lead-in is not possible at all or, maximum, a one-sided attachment is possible. Such an attachment, of course, cannot provide a reliable attachment for a subsequent concrete cast-over.

Accordingly, an object of the present invention is to provide a lead-in system for ceilings and walls having a trapezoidally corrugated sheet metal formwork, which can be reliability secured in all positions on all conventional trapezoidally corrugated sheet metal formworks.

Another object of the present invention is to provide a reliably securable fire-retarding lead-in system.

SUMMARY OF THE INVENTION

These and other objects of the present invention, which will become apparent hereinafter, are achieved by providing a system including a lead-in sleeve for receiving a tubular conduit or a cable and having at least three outer, circumferentially spaced from each other, fixing points for securing the lead-in sleeve to the trapezoidally corrugated sheet metal formwork, and at least two stiff locking elements each having a connection element for a formlocking connection with the fixing points of the lead-in sleeve and a mounting element for securing the locking element to peak regions of trapezoidal corrugations of the trapezoidally corrugated sheet metal formwork.

As it follows from above, the leading system according to the present invention, which it later becomes imbedded in concrete, substantially includes a lead-in sleeve having at least three outer fixing points circumferentially spaced from each other and arranged in a plan extending transverse to the axis of symmetry of the lead-in sleeve, with the fixing points being formed, preferably by radial surfaces of an outer ring, and at least two locking elements formlockingly connectable with at least one fixing point. The locking element is advantageously formed as a flat, deflection-resistant member including mounting means for securing the locking member to the trapezoidally corrugated sheet metal, advantageously in its peak region. The lead-in system further includes a tubular member which is later removed. The tubular member is preferably formed of an easily destructable cardboard and is received partially in the lead-in sleeve.

Advantageously, the mounting region of the lead-in system extends over two period lengths of the trapezoidally corrugated sheet metal formwork, with the correspondingly dimensioned locking elements, which are connected with the lead-in sleeve, on its both sides, via the lead-in sleeve fixing points. In this way, in all positions of the lead-in sleeve, a two-sided mounting or securing of the lead-in sleeve over the peak region of the trapezoidal corrugations of the sheet metal formwork becomes possible. For a purposeful shortening of the locking element, e.g., of the edge or corner regions, advantageously predetermined breaking areas are formed therein, e.g., as a row of elongate openings in the locking element formed of metal or as intermittent pressed out area.

Advantageously, the locking element is formed as a flat sheet member having a high deflection and torsional resistance and which can be safely mounted along the plane of the peak region of the trapezoidal corrugations which represents a stepped surface.

The mounting means for securing the locking element to the trapezoidally corrugated sheet metal formwork can be formed as flat surface regions which can be glued to the peak regions of the corrugations, as holes which permit to screw the locking element to the formwork, incisions and openings for forming a welding connection, or a combination of the above-listed means. The foregoing mounting means insure a simply realized, rigid and adequately strong connection of the lead-in system with the formwork.

The fixing points insure at least a three-point positioning of the lead-in sleeve on the trapezoidally corrugated sheet metal formwork, with one fixing point being connected with the formwork by at least one locking element and with at least two further fixing points being connected with the formwork by at least one further locking element. For connection of the locking elements with the fixing points, the locking elements have paired, adapted to each other, connection elements which define a suitable receiving groove for receiving a radial flat region forming a fixing point, whereby a formlocking connection of the locking element with the fixing point is formed. In the discussed embodiment, the connection elements are formed as sheet offset edge regions for receiving a radial flat region therebetween. For fixing points formed as fishplate, the connection element is formed as a correspondingly dimensioned, U-bent edge region that can be hanged up on the fishplate. For simultaneous connection with more than one fixing point, the connection elements are provided on a concavely shaped side of the locking element.

The locking element is advantageously formed of a sheet metal both surfaces of which are protected to prevent any conditions which may cause even a local corrosion during the constructional phase. For a definite positioning of the lead-in sleeve in its fixing points, the side edge of the locking element is provided with, advantageously, a plurality of connection elements. By providing, on the connection elements, which are formed on the concave side surface, a plurality of pegs which, form additional stops, the first stops being defined by the connection elements themselves, securing of different lead-in sleeves with outer rings having corresponding discrete radii became possible.

The tubular member, which extends through an opening formed in the trapezoidally corrugated sheet metal formwork and partially extends into the lead-in sleeve that surround it, serves as a space retainer and is removed after the concrete hardens. To this end, the tubular member is adequately protected against the hydrostatic pressure of the concrete and against the moisture of the fresh concrete, and is formed with an adequate length. The tubular member is formed with, advantageously, smooth non-adhesive surface having, preferably, a small surface tension. The tubular member can be formed as a plastic pipe or a waxed cardboard pipe. In particular, a cardboard pipe is easily handled during mounting and can be easily destructed after hardening of the concrete.

Advantageously, the lead-in sleeve is provided with a temporary cover for closing its opening, at least from above, against concrete.

To make the lead-in system according to the present invention as a fire-retarding system, the lead-in sleeve is provided, in its widen inner region, with a ring-shaped sealing for surrounding the received in the sleeve conduit or cable, which sealing is formed, at least partially, from an intermescent material. The fixing points are advantageously provided beneath the widen regions of the lead-in sleeve. This insures that the sealing is located above the peak region of the trapezoidal corrugations, with the widen region of the lead-in sleeve being completely imbedded in the concrete. As a result, in case of fire, the expandable intermescent mass is shielded over the entire radial perimeter from the heat-generated pressure and thereby insures the closing of the opening through which the conduit or cable extends.

The novel features of the present invention, which are considered as characteristic for the invention, are se forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 2 a perspective view of a locking element formed of sheet metal.

DETAILED DESCRIPTION OF THE PREFERRED EMBODIMENT

Figure 1:
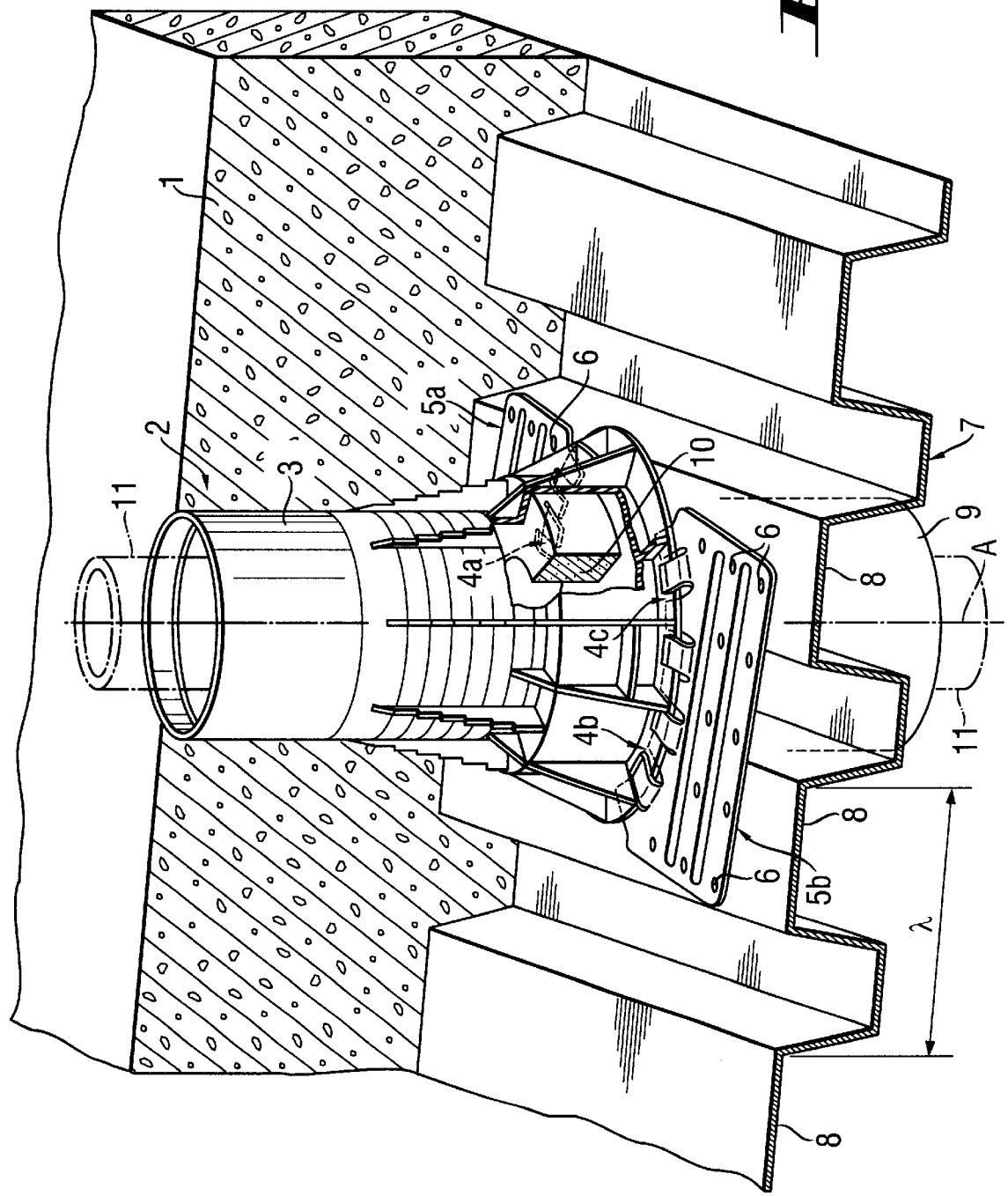
FIG. 1 a perspective view of a lead-in system for ceilings including a sheet metal with trapezoidal corrugatings.

A lead-in system 2 according to the present invention and which is shown in FIG. 1 and is later cast over with concrete 1, includes a lead-in sleeve 3 having at least three outer fixing points 4a, 4b, 4c which are circumferentially spaced from each other and are arranged in a plane extending transverse to an axis of symmetry A of the lead-in sleeve 3. The fixing points 4a, 4b, 4c are formed as radial flat regions of an outer ring surrounding the lead-in sleeve 3. The lead-in system 2 further includes two, substantially flat, deflection-resistant locking elements 5a, 5b having offset portions. The locking elements 5a, 5b are formed of a sheet metal and have mounting holes 6, e.g., for receiving screws which secure the locking elements to a formwork 7 of sheet metal with trapezoidal corrugations having a period length. The locking elements 5a, 5b are formlockingly connected with the fixing points 4a, 4b, 4c and are secured to peak regions 8 of the trapezoidal corrugations of the formwork-forming sheet metal. The lead-in system also includes a subsequently removable, tubular member 9 which is formed of easily destructable cardboard and which partially extends into the lead-in sleeve 3. A ring-shaped sealing 10, which is formed of a partially intumescent material, is arranged in a radially widen region of the lead-in sleeve 3. The sealing 10 would surround a subsequently inserted tubular conduit 11. The tubular conduit 11 will be fixed with locking elements 5a, 5b and will be completely circumferentially surrounded with concrete 1 above the plane of the peak regions 8 of the trapezoidal corrugations of the formwork sheet metal.

The locking element 5a, 5b is shown in FIG. 2. The locking element 5a, 5b is formed of a sheet metal protected on both sides by corrosion-resistant layers. The locking element 5a, 5b is substantially rectangular and has one concave side surface including a plurality of connection elements 12 each of which is formed of a relative large bearing surface 13 and an adjacent contact surface 14 which is bent-out of the locking element plane parallel thereto. The surface 14 simultaneously serves as a radial stop for the lead-in sleeve 3. The contact surface 14 has an offset, insertion, outer portion 15 with rounded edges. The portion 15 facilitate the engagement with a respective fixing point 4a, 4b, 4c of the lead-in sleeve 3. Small pegs 16, which are formed on some of the contact surfaces 14 of the concave side surface and which define optional stops, enable press-in fixing of different lead-in sleeves the outer rings of which defining the fixing points, have respective discrete radii. The remaining bearing surface of the locking element 5a, 5b, as it has been discussed above, has a plurality of holes of which insure a sufficient flexibility in mounting of the locking element 5a, 5b of the trapezoidally corrugated sheet metal. A plurality of reinforcing beads 17, which extend along the locking element 5a, 5b, insure high evenness, stiffness, and dimensional stability.

Thought the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A cast-in concrete (1), lead-in system (2) for ceilings and walls having a trapezoidally corrugated sheet metal formwork (7), the system comprising a lead-in sleeve (3)) for receiving one of a tubular conduit and a cable and having at least three outer, circumferentially spaced from each other, fixing points (4a, 4b, 4c) for securing the lead-in sleeve to the trapezoidally corrugated sheet metal formwork (7); and at least two stiff locking elements (5a, 5b) each having connection means (12) for a formlocking connection with the fixing points (4a, 4b, 4c) of the lead-in sleeve and mounting means (6) for securing the locking element (5a, 5b) to peak regions (8) of trapezoidal corrugations of the trapezoidally corrugated sheet metal formwork.

2. A lead-in system according to claim 1, further comprising a tubular member (9) for axially partially receiving the lead-in sleeve (3).

3. A lead-in system according to claim 2, wherein the tubular member extends through an opening formed in the formwork.

4. A lead-in system according to claim 1, wherein the fixing points (4a, 4b, 4c) are formed as radial surface regions of an outer ring associated with the lead-in sleeve (3).

5. A lead-in system according to claim 1, wherein the locking elements (5a, 5b) are formed of a substantially flat, deflection-resistant material.

6. A lead-in system according to claim 1, wherein the mounting means (12) extend longitudinally over a mounting region of the locking element (5a, 5b) corresponding to two period lengths (1) of the trapezoidally corrugated sheet metal formwork (2).

7. A lead-in system according to claim 1, wherein the connection means (12) is provided on a concave side surface of the locking element (5a, 5b) and comprises a plurality of connection elements.

8. A lead-in system according to claim 1, wherein each locking element (5a, 5b) comprises a predetermined breaking area that shortens the locking element.

9. A lead-in system according to claim 1, wherein the lead-in sleeve (3) has a radially widen region, and wherein the system includes a ring-shaped sealing (10) formed at least partially of intumescent material for circumferentially surrounding the to-be-received one of a conduit and a cable.

10. A lead-in system according to claim 9, wherein the ring-shaped sealing (10) is located so that in a mounted condition of the lead-in system, it is located above a plane of the peak regions (8) of the trapezoidal corrugations to insure securing of the lead-in sleeve (3)) with the locking elements (5a, 5b).

* * * * *